United States Patent
Grabowski et al.

(12)

(10) Patent No.: US 6,534,972 B1
(45) Date of Patent: Mar. 18, 2003

(54) MAGNETO-RESISTIVE POSITION SENSOR AND VARIABLE RELUCTANCE CONTROLLER INTERFACE CIRCUIT

(75) Inventors: John Robert Grabowski, Dearborn, MI (US); Theodore Joseph Filippi, Trenton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/063,056

(22) Filed: Mar. 15, 2002

(51) Int. Cl.[7] ................................................. G01B 7/30
(52) U.S. Cl. ..................... 324/207.25; 324/207.21; 324/207.2
(58) Field of Search ........................ 324/207.12, 207.15, 324/207.18, 207.2, 207.21, 207.25, 160, 166, 173, 174; 338/32 R, 32 H; 327/321

(56) References Cited

U.S. PATENT DOCUMENTS

| | | | |
|---|---|---|---|
| 4,321,592 A | | 3/1982 | Crandall et al. |
| 5,003,948 A | * | 4/1991 | Churchill et al. ........... 123/352 |
| 5,055,781 A | | 10/1991 | Sakakibara et al. |
| 5,196,793 A | | 3/1993 | Good et al. |
| 5,323,115 A | | 6/1994 | Werner, Jr. |
| 5,404,304 A | * | 4/1995 | Wise et al. .................. 700/304 |
| 5,706,199 A | | 1/1998 | Wilson et al. |
| 5,751,069 A | | 5/1998 | Rajashekara et al. |
| 6,041,647 A | | 3/2000 | Matsuoka |
| 6,042,505 A | | 3/2000 | Bellinger |

* cited by examiner

*Primary Examiner*—Jay Patidar
(74) *Attorney, Agent, or Firm*—Artz & Artz, P.C.; Carlos L. Hanze

(57) ABSTRACT

A position sensor and variable reluctance type controller interface circuit (10) is provided. The circuit (10) includes a position sensor (22) having an output terminal (OUT) and generating a position signal. A variable reluctance type controller (20), having an input bus (26), is electrically coupled to the position sensor (22) via a voltage divider circuit (24). The circuit (24) supplies a voltage differential output signal in response to the position signal to the input bus (26). A method of interfacing between the position sensor (22) and the controller (20) is also provided. The method includes generating a position signal. The reference voltage on the controller (20) is divided to an approximately fixed voltage level. The approximately fixed voltage level is supplied to a negative input terminal (INPUT−) on the variable reluctance type controller. The position signal is received on a positive input terminal (INPUT+) of the controller (20).

19 Claims, 1 Drawing Sheet

MAGNETO-RESISTIVE POSITION SENSOR AND VARIABLE RELUCTANCE CONTROLLER INTERFACE CIRCUIT

BACKGROUND OF INVENTION

Technical Field

The present invention relates generally to hybrid electric vehicle systems, and more particularly to a method and apparatus for interfacing between a magneto-resistive position sensor and a variable reluctance controller.

BACKGROUND OF THE INVENTION

Variable reluctance (VR) engine crankshaft position sensors have been used in hybrid electric vehicles to determine positioning of a crankshaft and in turn aid in engine control timing. VR position sensors have been deemed unreliable due to stray magnetic fields from vehicle combined starter/alternator, which are located in a close proximity to the VR position sensors.

As a result Magneto-resistive (MR) position sensors have become widely used in hybrid electric vehicles. MR position sensors replace the use of VR position sensors in determining crankshaft positioning. Although, MR position sensors are less sensitive to stray magnetic fields, due to internal active digital circuitry rather than passive nature of VR position sensors, they are not compatible with VR type engine controllers. In other words VR type engine controllers are designed to receive a differential voltage from a VR position sensor. The output of a MR position sensor is a digital, usually 0 to 5 volt or 0 to 12 volt signal.

Currently in order to use a MR position sensor, an engine controller that is compatible with an MR position sensor is required, as to be able to interface with the MR position sensor. Hybrid electric vehicles that use a VR type engine controller are not compatible with MR position sensors. Therefore, in order for a hybrid electric vehicle to maintain using a VR type engine controller and switch from a VR position sensor to a MR position sensor, the controller needs to be redesigned or replaced by an engine controller that is MR position sensor compatible. Redesigning of an engine controller increases vehicle design costs as well as production costs.

There is a continuous effort to improve the functionality and cost of hybrid electric vehicles. Therefore, it would be desirable to provide a method of interfacing a MR position sensor with a VR engine crankshaft controller without redesign and reproduction of a VR type engine controller.

SUMMARY OF INVENTION

The foregoing and other advantages are provided by a method and apparatus for interfacing between a magneto-resistive position sensor and a variable reluctance controller. A position sensor and variable reluctance type controller interface circuit is provided. The circuit includes a position sensor having an output terminal and generating a position signal. A variable reluctance type controller, having an input bus, is electrically coupled to the position sensor via a voltage divider circuit. The voltage divider circuit supplies a voltage differential output signal in response to the position signal to the input bus.

A method of interfacing between the position sensor and the variable reluctance type controller is also provided. The method includes generating a position signal. A reference voltage on the variable reluctance type controller is divided to an approximately fixed voltage level. The approximately fixed voltage level is supplied to a negative input terminal on the variable reluctance type controller. The position signal is received on a positive input terminal of the variable reluctance type controller.

One of several advantages of the present invention is that it provides a technique for interfacing between a magneto-resistive position sensor and a variable reluctance type engine controller. Thereby, preventing the need for redesign of the variable reluctance type engine controller and therefore saving costs in redesign and production.

Another advantage of the present invention is that in being able to interface between a magneto-resistive position sensor and a variable reluctance type engine controller, a rotational position sensing system using these two components is more reliable than systems using variable reluctance position sensors.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
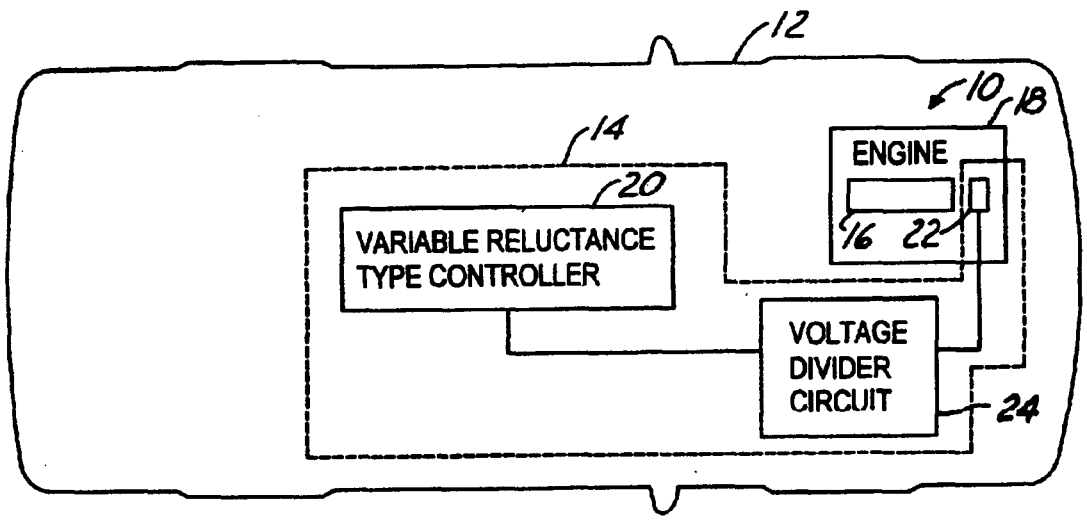
FIG. 1 is a block diagrammatic view of a rotational position sensing system in accordance with an embodiment of the present invention.

In each of the following figures, the same reference numerals are used to refer to the same components. While the present invention is described with respect to a method and apparatus for interfacing between a position sensor and a variable reluctance type controller, the present invention may be adapted to be used in various systems including: automotive vehicle systems, control systems, sensor systems, or other applications containing position sensors. Such applications include but are not limited to crankshaft position sensing, camshaft position sensing, transmission gear position sensing, electronic throttle control, throttle position sensing, pedal position sensing, and other rotational position sensing applications.

In the following description, various operating parameters and components are described for one constructed embodiment. These specific parameters and components are included as examples and are not meant to be limiting.

Also, in the following description the terms "variable reluctance type controller" refer to a controller having a differential voltage input that is designed to correspond to a variable reluctance sensor output.

Additionally, in the following description, the term "position" does not refer to a location in a vehicle. Position refers to an orientation or an arrangement in an operating range for a device. For example, a crankshaft of a vehicle may vary in position from a position corresponding to 0° to a position corresponding to 359°.

Moreover, in the present invention the term "digital" refers to a signal that may vary in voltage between a minimum value and a maximum value. The term digital does not necessarily mean a signal having only an output voltage of 0 or 5 volts. For example, a digital output signal may have an output voltage from 0 to 5 volts and may be any voltage level between 0 and 5 volts.

Referring now to FIG. 1, a block diagrammatic view of a rotational position sensing system 10 for an automotive vehicle 12 in accordance with an embodiment of the present invention is shown. The system 10 includes position sensor and variable reluctance type controller interface circuit 14 and a crankshaft 16 of an engine 18. The interface circuit 14 includes a variable reluctance type controller 20 and a position sensor 22. The controller 20 is electrically coupled to the position sensor 22 via a voltage divider circuit 24. The divider circuit 24 allows the controller 20 to interface with the position sensor 22 by converting a digital output signal from the position sensor 22 to a voltage differential signal, which is received by the controller 20.

The controller 20 is preferably microprocessor based such as a computer having a central processing unit, memory (RAM and/or ROM), and associated input and output buses. The controller 20 may be a portion of a central vehicle main control unit, an engine controller, an interactive vehicle dynamics module, or a stand-alone controller.

The position sensor 22 monitors the position of the crankshaft 16 and generates a position signal corresponding to the position of the crankshaft 16. The position sensor 22 may be any one of the following sensors: a magneto-resistive position sensor, a hall effect position sensor, or other position sensor having a digital output signal.

Figure 2:
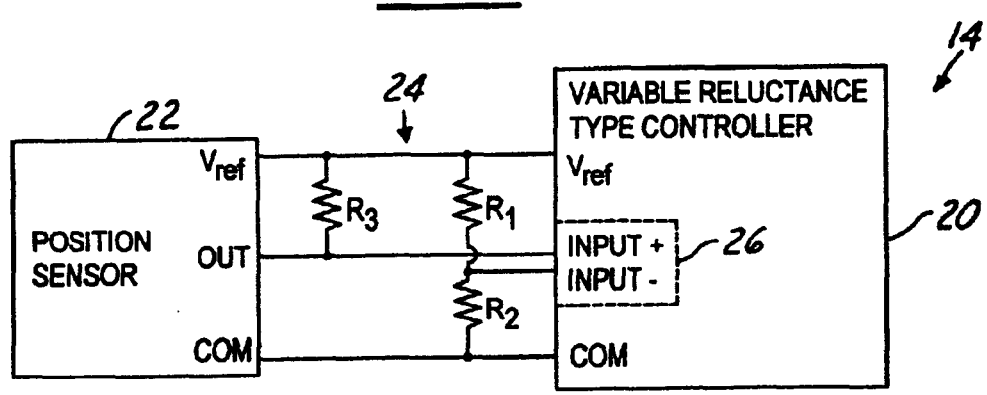
FIG. 2 is a block diagrammatic view of a position sensor and variable reluctance type controller interface circuit in accordance with an embodiment of the present invention.

Referring now to FIG. 2, a block diagrammatic view of the interface circuit 14 in accordance with an embodiment of the present invention is shown. The controller 20 and the position sensor 22 have a voltage reference terminal $V_{ref}$ and a common terminal COM. The terminal $V_{ref}$ of the position sensor 22 is electrically coupled to the terminal $V_{ref}$ of the controller 20. Similarly, the terminal COM of the position sensor 22 is electrically coupled to the terminal COM of the controller 20. The controller 20 has a differential voltage input bus 26. The input bus 26 includes a positive terminal INPUT+ and a negative terminal INPUT-. The position sensor 22 has a digital output terminal OUT. The divider circuit 24 converts the digital output signal from the position sensor 22 to the differential input signal received by the controller 20 through the use of three resistors $R_1$, $R_2$, and $R_3$.

$R_1$ and $R_2$ divide the voltage potential across terminal $V_{ref}$ and the terminal COM of the controller 14 so as to have an approximately fixed voltage level at the terminal INPUT-. The approximately fixed voltage level may vary between a predetermined minimum voltage level and a predetermined maximum voltage level. For example, the minimum voltage level may be 0 volts and the maximum voltage level may be 5 volts, where the voltage at the terminal INPUT- is approximately constant at a level between 0 and 5 volts. $R_1$ and $R_2$ may be of various type, style, and resistance known in the art. In a preferred embodiment of the present invention the approximately fixed voltage level is equal to a third of the voltage potential across the terminal $V_{ref}$ and the terminal COM of the controller 20. The controller 20 is more sensitive to position sensor output signals when the voltage at terminal INPUT+ is a third of the voltage level at terminal $V_{ref}$, relative to terminal COM. The better sensitivity allows the controller 20 to respond quicker to rotational changes in the crankshaft 16 and, therefore, has increased accuracy in determining the position of the crankshaft 16.

$R_3$ is a current limiting resistor. $R_3$ limits the amount of current drawn from the position sensor 22 to prevent damage to the position sensor 22. $R_3$ may also be of various type, style, and resistance known in the art.

Figure 3:
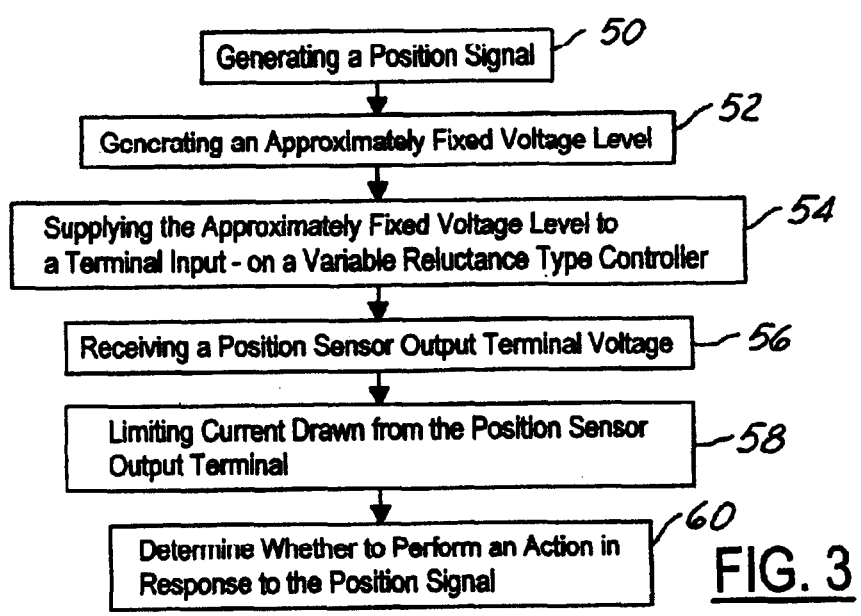
FIG. 3 is a logic flow diagram illustrating a method of interfacing between a position sensor and a variable reluctance type controller in accordance with an embodiment of the present invention.

Referring now to FIG. 3, a logic flow diagram illustrating a method of interfacing between the position sensor 22 and the controller 20 in accordance with an embodiment of the present invention is shown.

In step 50, the position sensor 22 monitors the position of the crankshaft 16 and generates a position signal.

In step 52, the divider circuit 24 divides a reference voltage from the controller 20 and the position sensor 22 to an approximately fixed voltage level. Of course, the approximately fixed voltage level is relative to the voltage potential across terminal $V_{ref}$ and terminal COM of the controller 20 and may change accordingly.

In step 54, the divider circuit 24 supplies the approximately fixed voltage level to the terminal INPUT- on the controller 20. The approximately fixed voltage level is approximately a third of the voltage potential across the terminal $V_{ref}$ and the terminal COM of the controller 20.

In step 56, the controller 20 receives a position sensor output terminal voltage on the terminal INPUT+.

In step 58, current flow drawn from the position sensor 22 is limited by electrically coupling $R_3$ across terminal $V_{ref}$ and terminal OUT of the position sensor 22.

In step 60, the controller 20 determines whether to perform an action in response to the received position sensor output terminal voltage. The action may include adjusting engine timing, adjusting fuel or air intake, or other engine control actions known in the art.

Although, the above steps are described in sequential form and in a certain order, this is meant to be just an illustrative example, the above steps may be performed simultaneously and in a different order.

The present invention provides a method of interfacing between a position sensor and a variable reluctance type controller within a rotational position sensing system. The position sensor may be a non-variable reluctance position sensor. The ability to interface a magneto-resistive position sensor to a variable reluctance type controller eliminates the need for redesigning of the controller and reproduction of the controller. Also, the present invention reduces the effect of stray magnetic field effects on signals received from the position sensor by the controller. In so doing, increases reliability, accuracy, and responsiveness of the rotational position sensing system.

The above-described apparatus, to one skilled in the art, is capable of being adapted for various purposes and is not limited to the following systems: automotive vehicle systems, control systems, sensor systems, or other applications containing position sensors. The above-described invention may also be varied without deviating from the spirit and scope of the invention as contemplated by the following claims.

What is claimed is:

1. A position sensor and variable reluctance type controller interface circuit comprising:

a position sensor comprising an output terminal and generating a position signal;

a variable reluctance type controller comprising an input bus; and a voltage divider circuit electrically coupling said position sensor and said variable reluctance type controller, said voltage divider circuit supplying a voltage differential output signal in response to said position signal to said input bus.

2. A circuit as in claim 1 wherein said position sensor is a magneto-resistive position sensor.

3. A circuit as in claim 1 wherein said variable reluctance type controller comprises:

a variable reluctance type controller reference voltage terminal;

said input bus comprising;
a positive input terminal; and
a negative input terminal; and
a variable reluctance controller common terminal.

4. A circuit as in claim 3 wherein said position sensor comprises:

a position sensor reference voltage terminal;

said output terminal; and a position sensor common terminal.

5. A circuit as in claim 4 wherein said voltage divider circuit comprises a first resistor electrically coupled to said variable reluctance type controller reference voltage terminal, said position sensor reference voltage terminal, said positive input terminal, and said output terminal.

6. A circuit as in claim 3 wherein said voltage divider circuit supplies a different voltage potential between said variable reluctance type controller reference voltage terminal and said positive input terminal than between said negative input terminal and said variable reluctance type controller common terminal.

7. A circuit as in claim 3 wherein said voltage divider circuit supplies a lower voltage potential across said variable reluctance type controller reference voltage terminal and said variable reluctance type controller common terminal than across said negative input terminal and said variable reluctance type controller common terminal.

8. A circuit as in claim 3 wherein said voltage divider circuit supplies approximately a third of the voltage potential across said variable reluctance type controller reference voltage terminal and said variable reluctance type controller common terminal to said negative input terminal and said variable reluctance type controller common terminal.

9. A circuit as in claim 1 further comprising a current limiting resistor electrically coupled to a reference voltage terminal and said output terminal of said position sensor.

10. A circuit as in claim 1 wherein said voltage divider circuit comprises a current limiting resistor electrically coupled to a reference voltage terminal and said output terminal of said position sensor.

11. A method of interfacing between a position sensor and a variable reluctance type controller comprising:

generating a position signal;

dividing a reference voltage on the variable reluctance type controller to an approximately fixed voltage level;

supplying said approximately fixed voltage level to a negative input terminal on said variable reluctance type controller; and receiving said position signal on a positive input terminal of said variable reluctance type controller.

12. A method as in claim 11 further comprising limiting current flow output on the position sensor.

13. A method as in claim 11 wherein supplying said approximately fixed voltage level said voltage divider circuit supplies a third of a variable reluctance type controller reference voltage to said negative input terminal.

14. A rotational position sensing system for an automotive vehicle comprising:

a rotating device;

a position sensor coupled to said rotating device and generating a position signal; and a variable reluctance type controller electrically coupled to said position sensor via a voltage divider circuit, said voltage divider circuit supplying a voltage differential output signal in response to said position signal to said variable reluctance type controller.

15. A system as in claim 14 wherein said voltage divider circuit comprises a current limiting resistor to limit current output of said position sensor.

16. A system as in claim 14 wherein said voltage divider circuit supplies a constant voltage to a negative input terminal on said variable reluctance type controller.

17. A position sensor and variable reluctance type controller interface circuit comprising:

a position sensor comprising generating a position signal and comprising;
a position sensor reference voltage terminal;
an output terminal; and
a position sensor common terminal;

a variable reluctance type controller comprising;
a variable reluctance type controller reference voltage terminal;
a positive input terminal;
a negative input terminal; and
a variable reluctance controller common terminal; and a voltage divider circuit electrically coupling said position sensor and said variable reluctance type controller, said voltage divider circuit supplying a voltage differential output in response to said position signal to said positive input terminal and said negative input terminal.

18. A circuit as in claim 17 wherein said voltage divider circuit comprises a current limiting resistor electrically coupled to a reference voltage terminal and an output terminal of said position sensor.

19. A circuit as in claim 17 wherein said voltage divider circuit supplies a lower voltage potential across said variable reluctance type controller reference voltage terminal and said variable reluctance type controller common terminal than across said negative input terminal and said variable reluctance type controller common terminal.

* * * * *